United States Patent
Silorio et al.

(10) Patent No.: US 11,697,199 B2
(45) Date of Patent: Jul. 11, 2023

(54) POWER LANDSCAPING TOOL ENSEMBLE FOR USING MULTIPLE TOOL HEADS

(71) Applicant: TOWA INDUSTRIES, LLC, Campbell, CA (US)

(72) Inventors: Ron Silorio, Pittsburg, CA (US); Richard K. Ogawa, Sr., Palo Alto, CA (US)

(73) Assignee: TOWA INDUSTRIES, INCORPORATED, Campbell, CA (US)

(*) Notice: Subject to any disclaimer, the term of this patent is extended or adjusted under 35 U.S.C. 154(b) by 228 days.

(21) Appl. No.: 17/183,600

(22) Filed: Feb. 24, 2021

(65) Prior Publication Data
US 2022/0266437 A1 Aug. 25, 2022

(51) Int. Cl.
| | |
|---|---|
| *B25F 3/00* | (2006.01) |
| *B25F 5/02* | (2006.01) |
| *A01B 1/06* | (2006.01) |
| *A01B 1/22* | (2006.01) |
| *A01D 34/90* | (2006.01) |
| *A01G 3/053* | (2006.01) |

(52) U.S. Cl.
CPC ............... *B25F 3/00* (2013.01); *A01B 1/065* (2013.01); *A01B 1/227* (2013.01); *A01D 34/90* (2013.01); *A01G 3/053* (2013.01); *B25F 5/02* (2013.01)

(58) Field of Classification Search
CPC . A01B 1/065; A01D 34/84; B25F 3/00; B25F 5/02
See application file for complete search history.

(56) References Cited

U.S. PATENT DOCUMENTS

| | | | | |
|---|---|---|---|---|
| 4,505,040 A | * | 3/1985 | Everts | B25F 3/00 |
| | | | | 30/296.1 |
| 4,733,471 A | * | 3/1988 | Rahe | A01D 34/90 |
| | | | | 403/312 |
| 5,603,173 A | * | 2/1997 | Brazell | E01H 5/04 |
| | | | | 37/246 |
| 5,810,093 A | | 9/1998 | Howard | |
| 6,006,434 A | * | 12/1999 | Templeton | A01D 34/90 |
| | | | | 30/296.1 |
| 7,516,602 B1 | * | 4/2009 | O'Dell | A01D 34/84 |
| | | | | 56/16.9 |

(Continued)

FOREIGN PATENT DOCUMENTS

| | | |
|---|---|---|
| CN | 211125425 U | 7/2020 |
| CN | 211220562 U | 8/2020 |

(Continued)

*Primary Examiner* — Thomas M Wittenschlaeger
*Assistant Examiner* — David G Shutty
(74) *Attorney, Agent, or Firm* — Microelectronic Devices IP LLC; Shawn T. Walsh

(57) ABSTRACT

A power tool ensemble includes at least a power head, a first shaft coupler, and a second shaft coupler, for use with tool heads of landscaping tools. The power head includes a motor and a power shaft mechanically coupled to the motor. Each shaft coupler includes a power shaft connecter for connecting to the power shaft, and a shaft-specific connecter for connecting to tool shafts of the tool heads. In each shaft coupler, the power shaft connecter is mechanically coupled to the shaft-specific connecter. The shaft-specific connecter in the first shaft coupler has a different tool shaft configuration from the shaft-specific connecter in the second shaft coupler.

20 Claims, 8 Drawing Sheets

(56) References Cited

U.S. PATENT DOCUMENTS

| | | | |
|---|---|---|---|
| 7,707,728 B2 | 5/2010 | Cobb | |
| 8,608,118 B2 * | 12/2013 | Lai | F16B 7/1454 |
| | | | 403/374.5 |
| 8,651,196 B2 * | 2/2014 | Sedmak | A01B 33/00 |
| | | | 172/40 |
| 9,955,627 B2 * | 5/2018 | Nakano | A01G 3/062 |
| 10,279,461 B2 | 5/2019 | Miaowu et al. | |
| 2006/0248731 A1 * | 11/2006 | Suzuki | A01D 34/90 |
| | | | 30/276 |
| 2011/0003512 A1 * | 1/2011 | Bower | H01R 13/642 |
| | | | 439/627 |
| 2013/0075122 A1 * | 3/2013 | Yamada | F16D 1/112 |
| | | | 464/182 |
| 2013/0142563 A1 * | 6/2013 | Sumi | A01D 34/902 |
| | | | 403/109.1 |
| 2016/0375571 A1 * | 12/2016 | Gieske | B27B 17/0008 |
| | | | 30/296.1 |
| 2017/0251608 A1 * | 9/2017 | Chou | A01G 3/086 |
| 2018/0092298 A1 * | 4/2018 | Takahashi | A01D 34/84 |
| 2018/0104809 A1 * | 4/2018 | Dyer | B27B 17/0016 |
| 2018/0361555 A1 * | 12/2018 | Miaowu | B25F 3/00 |
| 2019/0090405 A1 * | 3/2019 | Bermudez | A01G 3/062 |
| 2019/0308309 A1 * | 10/2019 | Gregorich | B23B 45/003 |
| 2019/0358801 A1 * | 11/2019 | McCue | B25F 5/02 |
| 2020/0260644 A1 * | 8/2020 | Ichikawa | A01D 34/78 |
| 2020/0353605 A1 * | 11/2020 | Kaye, Jr. | B25B 23/0028 |
| 2020/0384625 A1 * | 12/2020 | Zugen | B25F 1/003 |
| 2021/0039241 A1 * | 2/2021 | Baumann | B25F 3/00 |
| 2021/0234431 A1 * | 7/2021 | Momiyama | B25F 5/008 |
| 2022/0266437 A1 * | 8/2022 | Silorio | A01G 3/053 |
| 2022/0297338 A1 * | 9/2022 | Li | B25F 5/02 |

FOREIGN PATENT DOCUMENTS

| | | | | |
|---|---|---|---|---|
| EP | 2407021 A1 * | 1/2012 | | A01D 34/90 |
| JP | 2006288296 A * | 10/2006 | | A01D 34/90 |

* cited by examiner

POWER LANDSCAPING TOOL ENSEMBLE FOR USING MULTIPLE TOOL HEADS

FIELD

This disclosure relates to the field of outdoor power equipment. More particularly, but not exclusively, this disclosure relates to handheld electrically powered outdoor power equipment.

BACKGROUND

Outdoor power equipment includes weed trimmers, pole saws, hedge trimmers, garden tillers, pruning shears, leaf blowers, and lawn edgers. A typical power landscaping tool includes a motor, either an electric motor or a combustion engine, which powers a tool head, such as a weed trimmer head, or a pole saw head, or a hedge trimmer head, etc. The motor represents a major portion of the cost of the power tool.

SUMMARY

The present disclosure introduces a power tool ensemble including a power head, a first shaft coupler, and a second shaft coupler. The power head includes a motor, a power shaft mechanically coupled to the motor, and a motor control apparatus coupled to the motor.

The first shaft coupler includes a first power shaft connecter and a first shaft-specific connecter, coupled to the first power shaft connecter. The first power shaft connecter is configured to be capable of being mechanically coupled to the power shaft of the power head. The first shaft-specific connecter is configured to be capable of being mechanically coupled to a first tool shaft of a first tool head. The first tool head is not part of the power tool ensemble.

The second shaft coupler includes a second power shaft connecter and a second shaft-specific connecter, coupled to the second power shaft connecter. The second power shaft connecter is configured to be capable of being mechanically coupled to the power shaft of the power head. The second shaft-specific connecter is configured to be capable of being mechanically coupled to a second tool shaft of a second tool head. The second tool head is not part of the power tool ensemble.

The first tool shaft has a different configuration from the second tool shaft. The first shaft-specific connecter is not configured to be capable of being mechanically coupled to the second tool shaft. The second shaft-specific connecter is not configured to be capable of being mechanically coupled to the first tool shaft.

DETAILED DESCRIPTION

The present disclosure is described with reference to the attached figures. The figures are not drawn to scale and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

In addition, although some of the embodiments illustrated herein are shown in two dimensional views with various regions having depth and width, it should be clearly understood that these regions are illustrations of only a portion of a device that is actually a three dimensional structure. Accordingly, these regions will have three dimensions, including length, width, and depth, when fabricated on an actual device. Moreover, while the present invention is illustrated by embodiments directed to active devices, it is not intended that these illustrations be a limitation on the scope or applicability of the present invention. It is not intended that the active devices of the present invention be limited to the physical structures illustrated. These structures are included to demonstrate the utility and application of the present invention to presently preferred embodiments.

For the purposes of this disclosure, it will be understood that, if an element is referred to as being "connected" or "coupled" to another element, it may be directly connected or directly coupled to the other element, or intervening elements may be present. If an element is referred to as being "directly coupled" or "directly connected" to another element, it is understood there are no other intentionally disposed intervening elements present.

Figure 1:
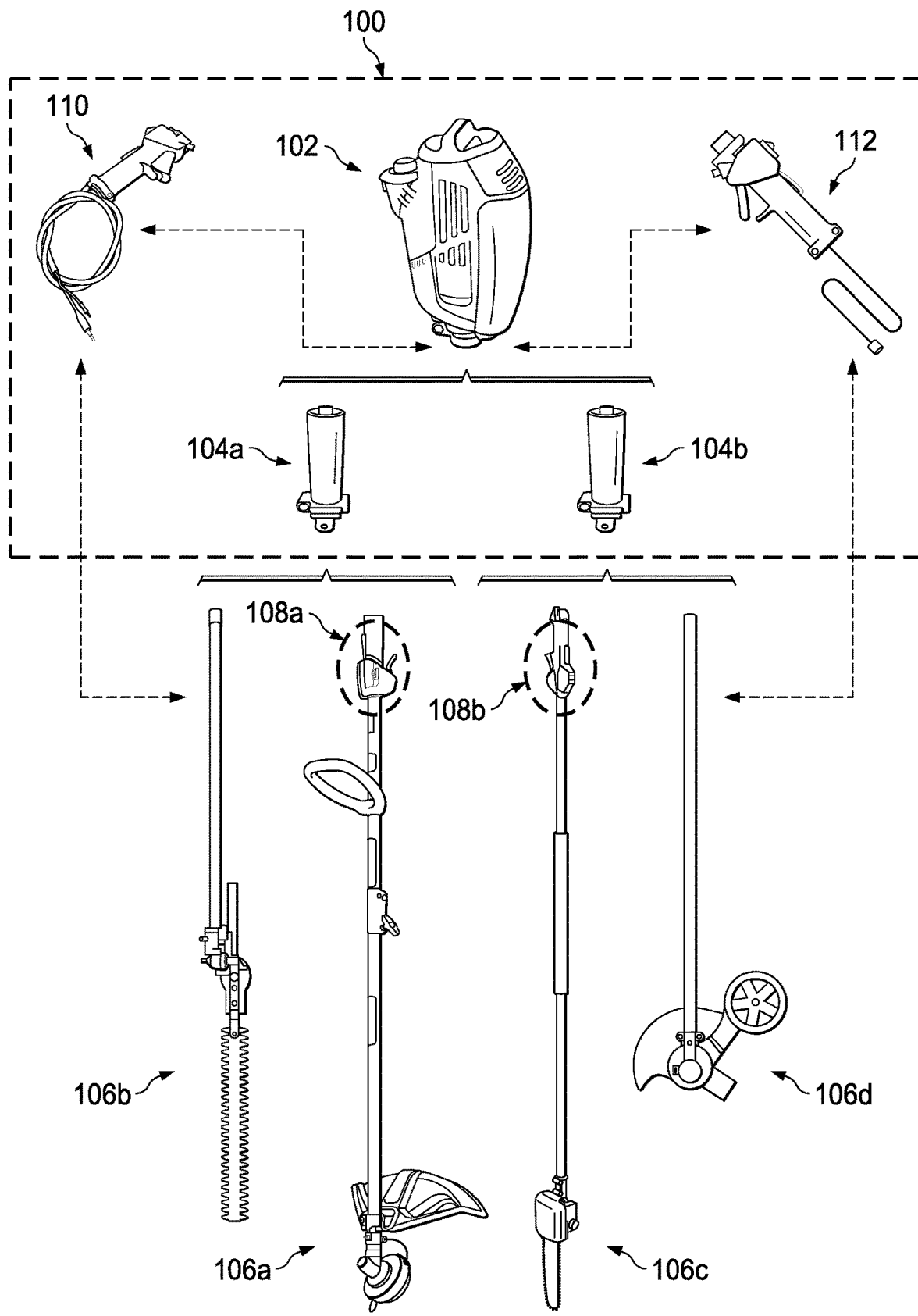
FIG. 1 depicts the power head, the first shaft coupler, and the second shaft coupler, with example tool heads.

A power tool ensemble includes at least a power head, a first shaft coupler, and a second shaft coupler. FIG. 1 depicts the power tool ensemble 100, with the power head 102, the first shaft coupler 104a, and the second shaft coupler 104b. The first shaft coupler 104a is configured to be capable of being mechanically coupled to the power head 102. The first shaft coupler 104a is further configured to be capable of being mechanically coupled to a first tool head 106a, depicted in FIG. 1 as a string trimmer head. Other manifestation for the first tool head 106a, such as a blade trimmer head, a reciprocating saw head, a chain saw head, a hedge trimmer head, a garden tiller head, a pruning shears head, or a lawn edger head, are within the scope of this example. The first tool head 106a is not part of the power tool ensemble 100, but is commercially available, for example, from a first manufacturer of landscaping tools, or from a retailer of landscaping tools. The first tool head 106a may be used with the power tool ensemble 100. During operation, the first shaft coupler 104a transfers mechanical power from the power head 102 to the first tool head 106a, operating the first tool head 106a. The first tool head 106a may include a first original equipment throttle 108a, as indicated in FIG. 1, which may be connected to the power head 102 to control the mechanical power delivered by the power head 102. Details of the power head 102 are disclosed in reference to FIG. 2A through FIG. 2F. The power head 102 is not configured to be capable of being directly mechanically connected to the first tool head 106a. Details of the first shaft coupler 104a are disclosed in reference to FIG. 3A through FIG. 3G. Thus, the first shaft coupler 104a advantageously enables operation of the first tool head 106a using the power head 102.

The first shaft coupler 104a is also configured to be capable of being mechanically coupled to a second tool head 106b, depicted in FIG. 1 as a hedge trimmer head. Other manifestation for the second tool head 106b are within the scope of this example. The second tool head 106b is not part of the power tool ensemble 100, but is also commercially available. For example, both the first tool head 106a and the second tool head 106b may be available from the first manufacturer of landscaping tools. The second tool head 106b may also be used with the power tool ensemble 100. During operation, the first shaft coupler 104a transfers mechanical power from the power head 102 to the second tool head 106b, operating the second tool head 106b. The second tool head 106b may lack a throttle, as indicated in FIG. 1, in which case the power tool ensemble 100 may include an add-on throttle 110. The add-on throttle 110 is installed on the second tool head 106b. A throttle cable of the add-on throttle 110 is connected to the power head 102 to control the mechanical power delivered by the power head 102. The add-on throttle 110 may be manifested as trigger throttle, as depicted in FIG. 1, a press-button throttle, or a toggle lever throttle, by way of example.

The power head 102 is not configured to be capable of being directly mechanically connected to the second tool head 106b. Thus, the first shaft coupler 104a advantageously enables operation of the second tool head 106b using the power head 102. The first tool head 106a and the second tool head 106b have similar tool shaft designs which enable the first shaft coupler 104a to be mechanically coupled to each. Furthermore, the first shaft coupler 104a may be capable of being mechanically coupled to additional tool heads, not shown, with similar tool shaft designs, available from the first manufacturer of landscaping tools, or from other manufacturers. The first shaft coupler 104a may thus enable operation of the first tool head 106a, the second tool head 106b, and the additional tool heads, using the power head 102, avoiding the expense of purchasing a power head specifically configured for the first tool head 106a, the second tool head 106b, and the additional tool heads.

The second shaft coupler 104b is configured to be capable of being mechanically coupled to the power head 102. The second shaft coupler 104b is further configured to be capable of being mechanically coupled to a third tool head 106c, depicted in FIG. 1 as a chain saw head, and to a fourth tool head 106d, depicted in FIG. 1 as a blade trimmer. Other manifestation for the third tool head 106c and the fourth tool head 106d are within the scope of this example. The third tool head 106c and the fourth tool head 106d are not parts of the power tool ensemble 100, but are commercially available, for example from a second manufacturer of landscaping tools, or from a retailer of landscaping tools. The third tool head 106c and the fourth tool head 106d may each be used with the power tool ensemble 100. During operation, when the third tool head 106c is coupled to the power head 102 through the second shaft coupler 104b, the second shaft coupler 104b transfers mechanical power from the power head 102 to the third tool head 106c, operating the third tool head 106c. Similarly, when the fourth tool head 106d is coupled to the power head 102 through the second shaft coupler 104b, the second shaft coupler 104b transfers mechanical power from the power head 102 to the fourth tool head 106d, operating the fourth tool head 106d.

The third tool head 106c may include a second original equipment throttle 108b, as indicated in FIG. 1, which may be connected to the power head 102 to control the mechanical power delivered by the power head 102. The fourth tool head 106d may lack a throttle, as indicated in FIG. 1. In versions of this example in which the power head 102 has an electric motor, the power tool ensemble 100 may include an add-on switch 112, to be installed on the fourth tool head 106d, to control the electric motor. The add-on switch 112 includes a switch cable that is connected to the power head 102. The add-on switch 112 may be manifested as a trigger switch, a press-button switch or a toggle lever switch, by way of example.

The power head 102 is not configured to be capable of being directly mechanically coupled to the third tool head 106c or the fourth tool head 106d. Thus, the second shaft coupler 104b advantageously enables operation of the third tool head 106c and the fourth tool head 106d using the power head 102. Similarly to the advantage accrued by the first shaft coupler 104a, the second shaft coupler 104b may be capable of being mechanically coupled to additional tool heads, not shown, with similar tool shaft designs, available from the second manufacturer of landscaping tools, enabling operation of the tool heads using the power head 102, avoiding the expense of purchasing a power head specifically configured for the third tool head 106c and the fourth tool head 106d.

Tool heads from different manufacturers of landscaping tools commonly have different tool shaft designs. Thus, the first shaft coupler 104a is not configured to be capable of being directly mechanically coupled to the third tool head 106c or to the fourth tool head 106d. Similarly, the second shaft coupler 104b is not configured to be capable of being directly mechanically coupled to the first tool head 106a or to the second tool head 106b. The power tool ensemble 100 advantageously enables use of the tool heads 106a, 106b, 106c, and 106d, as well as other tool heads, from the first and second manufacturers of landscaping tools, using the power head 102, avoiding the expense of purchasing separate power heads from each manufacturer of landscaping tools. Including the add-on throttle 110 and the add-on switch 112 in the power tool ensemble 100 advantageously enables use of the tool heads 106b and 106d, as well as other tool heads lacking throttles, from the first and second manufacturers of landscaping tools, using the power head 102. The power head 102, when mechanically coupled to one of the tool heads 106a, 106b, 106c, and 106d through the first shaft coupler 104a or the second shaft coupler 104b, provides a handheld electrically powered landscaping tool.

Figure 2A:
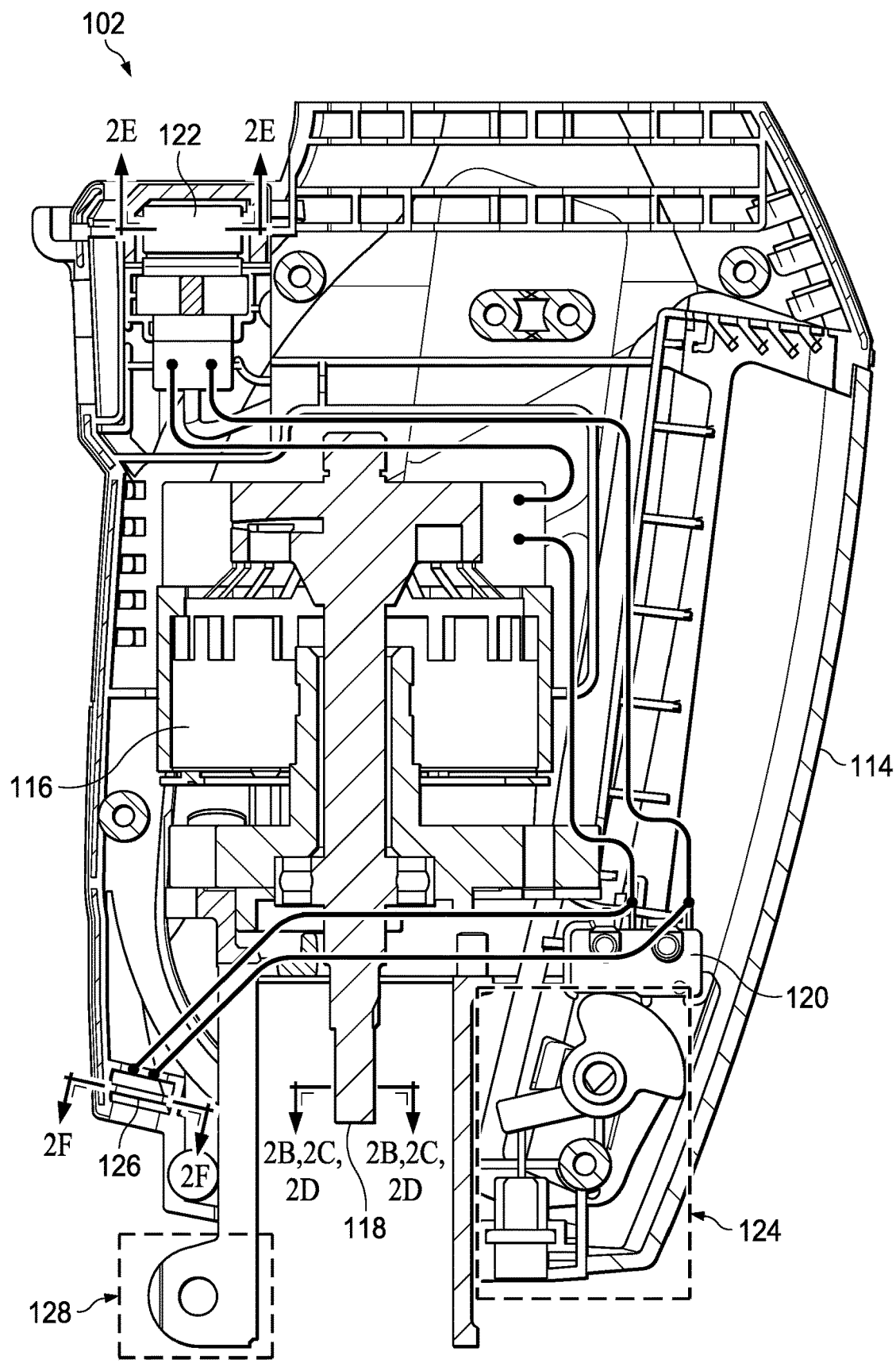
FIG. 2A through FIG. 2F are views of the power head.

FIG. 2A is cross section view of the power head 102 of FIG. 1. The power head 102 includes a housing 114 which provides structural support for components in the power head 102. The power head 102 includes a motor 116 located inside the housing 114. The motor 116 of this example may be manifested as an electric motor 116, as indicated in FIG. 2A. The electric motor 116 may be a direct current (DC) electric motor, by way of example. When manifested as a DC electric motor, the electric motor 116 may operate at 12 volts to 120 volts, by way of example. The electric motor 116 may have a power rating of 300 watts to 2,000 watts, by way of example.

Figure 2B:
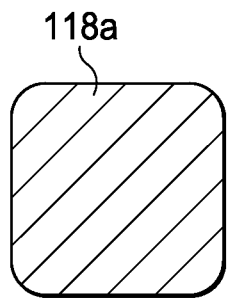
Figure 2C:
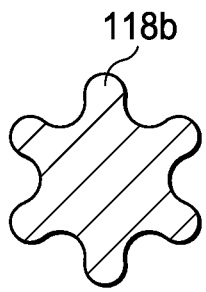
Figure 2D:
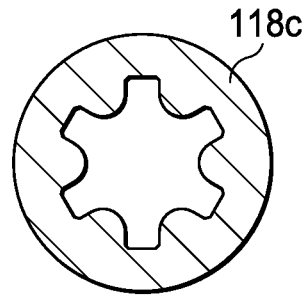

The power head 102 includes a power shaft 118 that is mechanically coupled to the electric motor 116. The power shaft 118 may be an extension of a rotor of the electric motor 116, as depicted in FIG. 2A. Other manifestations of the power shaft 118 are within the scope of this example. The power shaft 118 has a cross section that facilitates rotational transfer of mechanical power to the first shaft coupler 104a and the second shaft coupler 104b of FIG. 1. In one version of this example, a first power shaft 118a may have a square cross section, as depicted in FIG. 2B. In another version, a second power shaft 118b may have a splined cross section, as depicted in FIG. 2C. In a further version, a third power shaft 118c may have a socket configuration, such as a splined socket configuration, as depicted in FIG. 2D. Other cross section configurations for the power shaft 118 are within the scope of this example.

Referring back to FIG. 2A, the power head 102 may include an electric switch 120 that is electrically coupled to the electric motor 116, as depicted schematically in FIG. 2A. The electric switch 120 controls electric power to the electric motor 116. The electric switch 120 may be implemented as a single pole single throw switch, a double pole single throw switch, or a more complex switch. In one version of this example, the electric switch 120 may be implemented as a snap action switch, such as a plunger switch, depicted in FIG. 2A, or a lever switch actuated switch. In another version of this example, the electric switch 120 may be implemented as a reed switch that is actuated by a magnet. In a further version of this example, the electric switch 120 may be implemented as a solid state switch, such as a Hall effect switch. In other versions of this example, the electric switch 120 may use piezoelectric material or quantum tunneling composite (QTC) material to control bias to a power transistor of the electric switch 120. Other manifestations of the electric switch 120 are within the scope of this example.

Figure 2E:
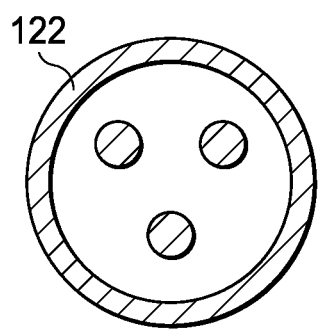

The power head 102 may include a power cable socket 122 electrically coupled to the electric motor 116 through the electric switch 120, as depicted schematically in FIG. 2A. In versions of this example in which the electric switch 120 is implemented as a single pole single throw switch, the power cable socket 122 may also be electrically coupled to the electric motor 116 by a return line, as depicted schematically in FIG. 2A. The power cable socket 122 is configured to receive electric power from an external power source and direct the electric power to the electric switch 120. The power cable socket 122 may have a three prong configuration, as depicted in FIG. 2E. Other configurations for the power cable socket 122 are within the scope of this example.

The power head 102 may include a throttle cable adapter 124 that is mechanically coupled to the electric switch 120, configured to operate the electric switch 120. The throttle cable adapter 124 is configured to be capable of being coupled to a throttle cable, which provides a longitudinal motion during operation of the handheld electrically powered landscaping tool. The longitudinal motion of the throttle cable is transferred to the throttle cable adapter 124, which operates the electric switch 120, controlling the electric power provided through the power cable socket 122 to the electric motor 116. The throttle cable adapter 124 may be connected to the throttle cables of the original equipment throttles 108a and 108b, or the throttle cable of the add-on throttle 110, of FIG. 1, for example.

Figure 2F:
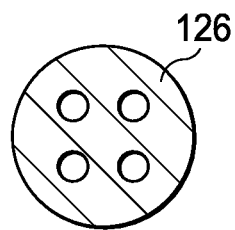

The power head 102 may include a switch cable socket 126 that is electrically wired in parallel to the electric switch 120, as indicated schematically in FIG. 2A. The switch cable socket 126 may have a four prong configuration, as depicted in FIG. 2F. Other configurations for the switch cable socket 126 are within the scope of this example. The switch cable socket 126 may be connected to the switch cable of the add-on switch 112 of FIG. 1, for example.

The power head 102 may include a head clamp mechanism 128 around the power shaft 118 configured to be capable of being clamped on the first shaft coupler 104a or the second shaft coupler 104b of FIG. 1. The head clamp mechanism 128 may advantageously reduce unwanted movement of the first shaft coupler 104a or the second shaft coupler 104b relative to the power head 102. The head clamp mechanism 128 may include a threaded knob, not shown, or a threaded lever, not shown, to adjust a clamping force on the first shaft coupler 104a or the second shaft coupler 104b.

Figure 3A:
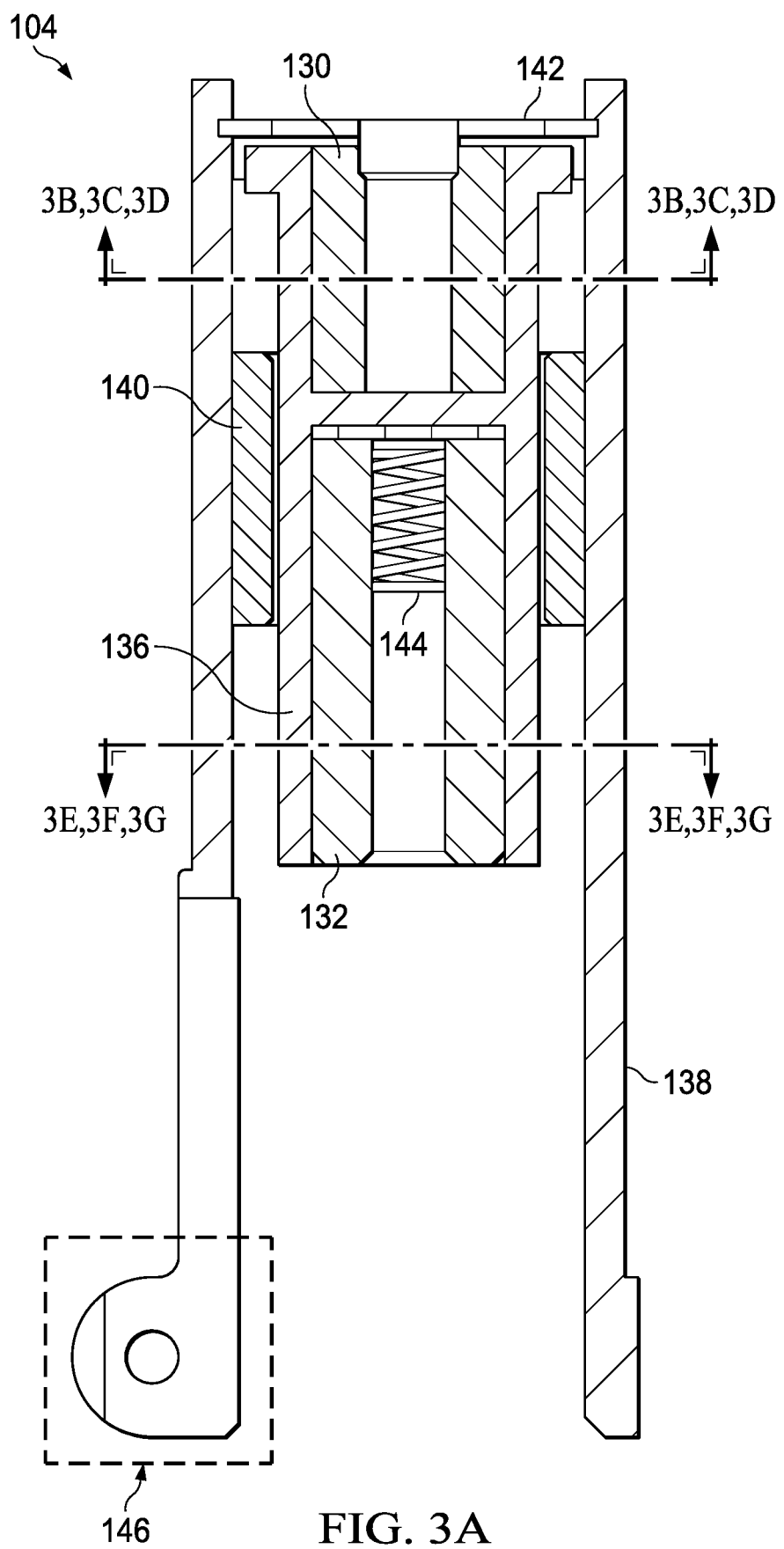
FIG. 3A through FIG. 3G are views of a shaft coupler.
Figure 3B:
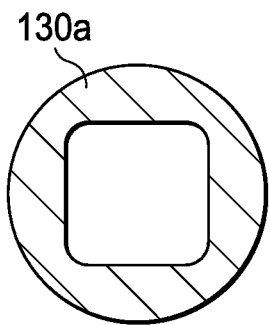
Figure 3C:
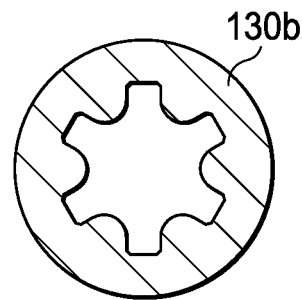
Figure 3D:
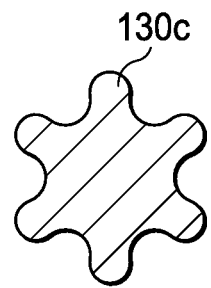
Figure 3E:
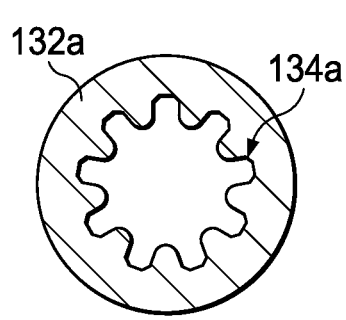
Figure 3F:
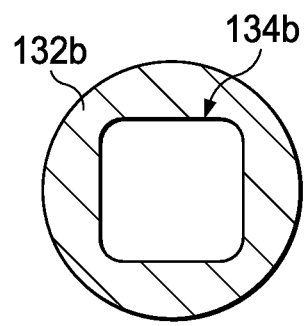
Figure 3G:
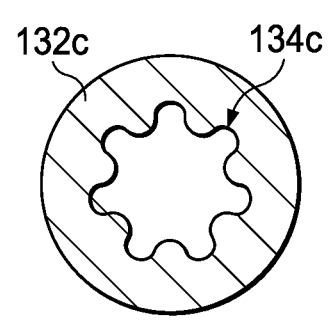

FIG. 3A is a cross section of an example shaft coupler 104, such as the first shaft coupler 104a or the second shaft coupler 104b, of FIG. 1. The shaft coupler 104 includes a power shaft connecter 130 that is configured to be capable of being mechanically connected to the power shaft 118 of FIG. 2A. The first shaft coupler 104a is configured to be capable of being mechanically coupled to the power head 102 by mechanically connecting the power shaft connecter 130 to the power shaft 118. The power shaft connecter 130 has a complementary configuration to the configuration of the power shaft 118. In one version of this example, a first power shaft connecter 130a may have a square socket configuration, as depicted in FIG. 3B, that enables being mechanically connected to the first power shaft 118a of FIG. 2B. In another version, a second power shaft connecter 130b may have a splined socket configuration, as depicted in FIG. 3C, that enables being mechanically connected to the second power shaft 118b of FIG. 2C. In a further version, a third power shaft connecter 130c may have a splined configuration, as depicted in FIG. 3D, that enables being mechanically connected to the third power shaft 118c of FIG. 2D.

The shaft coupler 104 includes a shaft-specific connecter 132 that is configured to be capable of being mechanically connected to a tool shaft of a tool head, such as the tool heads 106a, 106b, 106c, or 106d, of FIG. 1. The shaft-specific connecter 132 has a complementary configuration to the configuration of the specific tool shaft being used to provide the handheld electrically powered landscaping tool. In one version of this example, a first shaft-specific connecter 132a may have a first tool shaft configuration 134a, depicted in FIG. 3E as a nine-spline socket configuration. In another version, a second shaft-specific connecter 132b may have a second tool shaft configuration 134b, depicted in FIG. 3F as a square socket configuration. In a further version, a third shaft-specific connecter 132c may have a third tool shaft configuration 134c, depicted in FIG. 3G as a seven-spline socket configuration. Generally, the first tool shaft configuration 134a, the second tool shaft configuration 134b, and the third tool shaft configuration 134c are different from each other.

The power shaft connecter 130 is coupled to the shaft-specific connecter 132, to enable efficient transfer of rotational mechanical power from the power shaft 118 to the tool shaft of the tool head during operation of the handheld electrically powered landscaping tool. The power shaft connecter 130 may be coupled to the shaft-specific connecter 132 by a connecter sleeve 136, as depicted in FIG. 3A. Alternatively, the power shaft connecter 130 may be directly attached to the shaft-specific connecter 132, for example by a weld joint. In another variation of this example, the power shaft connecter 130 and the shaft-specific connecter 132 may be parts of a single integrated connector member.

The shaft coupler 104 includes a coupler housing 138 around the power shaft connecter 130 and the shaft-specific connecter 132. The power shaft connecter 130 and the shaft-specific connecter 132 are rotationally supported in the coupler housing 138, for example by a coupler bearing 140. When the shaft coupler 104 is mechanically coupled to the power head 102, the head clamp mechanism 128 of FIG. 1 may clamp on the coupler housing 138 around the power shaft connecter 130, providing structural integrity to the handheld electrically powered landscaping tool.

The shaft coupler 104 may include a retaining clip 142 set in an inside surface of the coupler housing 138. The retaining clip 142 may advantageously hold the power shaft connecter 130 in a desired position within the coupler housing 138. The shaft coupler 104 may include a shaft spring 144 in the shaft-specific connecter 132. The shaft spring 144 may advantageously reduce unwanted longitudinal vibration of the tool shaft in the tool head during operation of the handheld electrically powered landscaping tool.

The shaft coupler 104 may include a coupler clamp mechanism 146 on the coupler housing 138 around the shaft-specific connecter 132. The coupler clamp mechanism 146 is configured to be capable of being clamped on the tool head. The coupler clamp mechanism 146 may advantageously reduce unwanted movement of the tool head relative to the shaft coupler 104. The coupler clamp mechanism 146 may include a threaded knob, not shown, or a threaded lever, not shown, to adjust a clamping force on the tool head.

The shaft coupler 104 may have a length sufficient to provide secure clamping to the power head 102 and the tool head. The shaft coupler 104 may be sufficiently short as to facilitate maneuvering the handheld electrically powered landscaping tool, and to reduce cost of the shaft coupler 104. The shaft coupler 104 may be 3 inches to 7 inches long, advantageously satisfying both goals.

Figure 4:
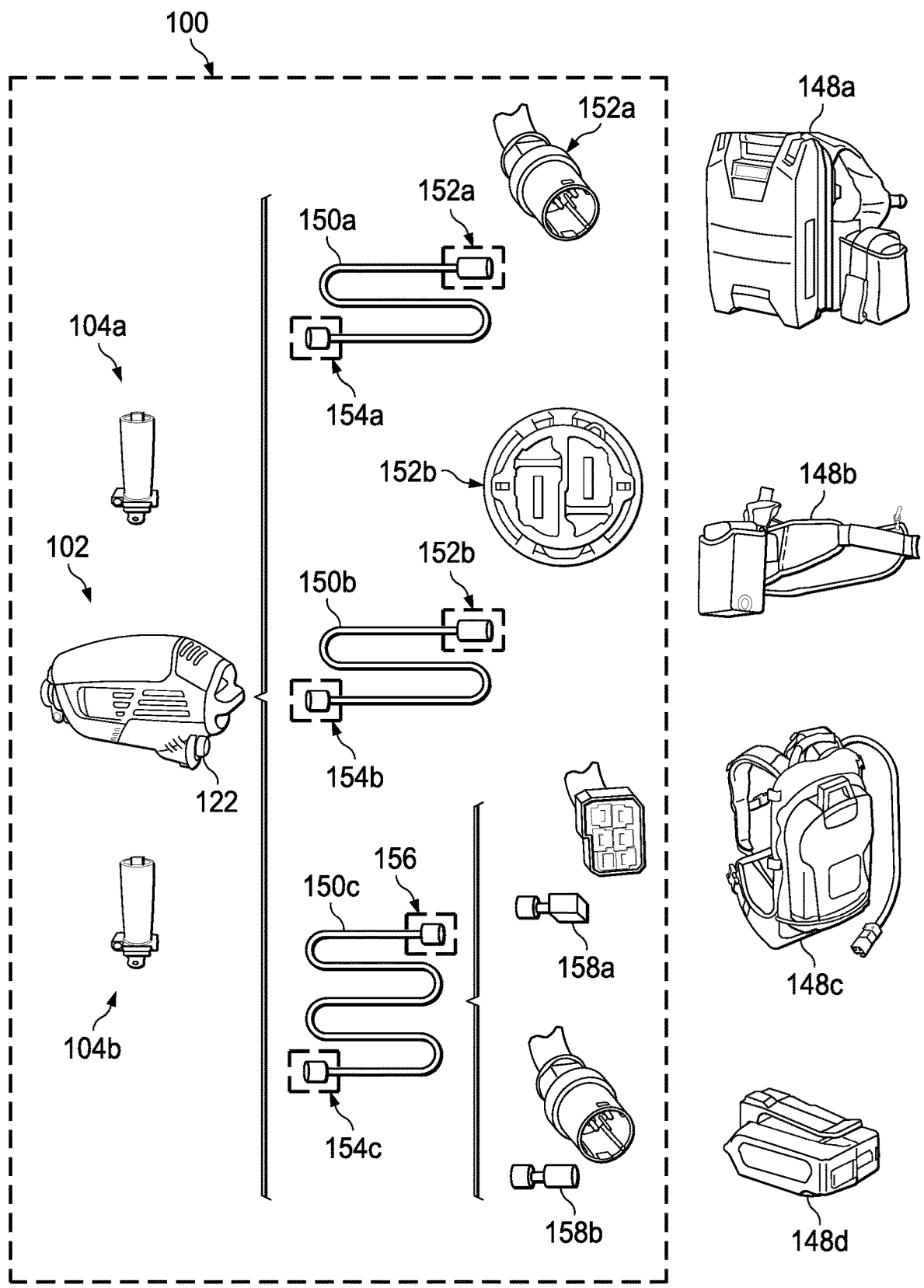
FIG. 4 depicts the power head with example power cable configurations.

FIG. 4 depicts the power head 102 with example power cable configurations. During operation of the handheld electrically powered landscaping tool, the power head 102 is electrically coupled to an external power source which provides electric power to the electric motor 116 of FIG. 2A. The external power source may be implemented as a battery belt, a battery backpack, or a fuel cell, by way of example. The power tool ensemble 100 may optionally include one or more power cables, and may further optionally include one or more battery-specific adapters, in addition to the first shaft coupler 104a and the second shaft coupler 104b.

In one version of this example, the external power source may be implemented as a first battery apparatus 148a, such as a battery backpack, as depicted in FIG. 4. The first battery apparatus 148a is not part of the power tool ensemble 100. The first battery apparatus 148a has a first power socket, not shown, with a first terminal configuration. Making an electrical connection to the first battery apparatus 148a requires a plug with a first complementary terminal configuration. In this version, the power tool ensemble 100 may include a first power cable 150a which includes a first battery-specific plug 152a having the first complementary terminal configuration. The first power cable 150a also includes a first power head plug 154a which has a power head terminal configuration that enables the first battery apparatus 148a to be connected to the power cable socket 122 of the power head 102. Having the first power cable 150a in the power tool ensemble 100 may advantageously enable use of the first battery apparatus 148a, with the power head 102 and one of the first shaft coupler 104a or the second shaft coupler 104b, with a tool head from a manufacturer that is different from a manufacturer of the first battery apparatus 148a, avoiding the expense of purchasing an external power source from the manufacturer of the tool head.

In another version of this example, the external power source may be implemented as a second battery apparatus 148b, such as a battery belt, as depicted in FIG. 4. The second battery apparatus 148b is not part of the power tool ensemble 100. The second battery apparatus 148b has a second power socket, not shown, with a second terminal configuration. Making an electrical connection to the second battery apparatus 148b requires a plug with a second complementary terminal configuration. In this version, the power tool ensemble 100 may include the first power cable 150a and a second power cable 150b, which includes a second battery-specific plug 152b having the second complementary terminal configuration. The second power cable 150b also includes a second power head plug 154b which has the power head terminal configuration that enables the second power cable 150b to be connected to the power cable socket 122 of the power head 102. The first battery apparatus 148a may be appropriate for some uses of the handheld electrically powered landscaping tool, while the second battery apparatus 148b may be appropriate for other uses of the handheld electrically powered landscaping tool. Having both the first power cable 150a and the second power cable 150b in the power tool ensemble 100 may advantageously enable use of the first battery apparatus 148a or the second battery apparatus 148b, with the power head 102 and one of the first shaft coupler 104a or the second shaft coupler 104b, with a tool head from a manufacturer that is different from a manufacturer of the first battery apparatus 148a and a manufacturer of the second battery apparatus 148b.

In a further version of this example, the external power source may be implemented alternately as a third battery apparatus 148c, such as a battery backpack, as depicted in FIG. 4, and as a fourth battery apparatus 148d, such as a clip-mounted battery apparatus, as depicted in FIG. 4. The third battery apparatus 148c and the fourth battery apparatus 148d are not parts of the power tool ensemble 100. The third battery apparatus 148c has a third power socket, not shown, with a third terminal configuration. The fourth battery apparatus 148d has a fourth power socket, not shown, with a fourth terminal configuration that is different from the third terminal configuration. Making an electrical connection to the third battery apparatus 148c requires a plug with a third complementary terminal configuration, while making an electrical connection to the fourth battery apparatus 148d requires a plug with a fourth complementary terminal configuration that is different from the third complementary terminal configuration.

In this version, the power tool ensemble 100 may include a third power cable 150c which includes a battery-end connector 156 and has a third power head plug 154c which has the power head terminal configuration as disclosed in reference to the power head plugs 154a and 154b. The power tool ensemble 100 also includes a first power cable adapter 158a having a cable-side connector configured to electrically couple to the battery-end connector 156 and a battery-specific plug configured to electrically couple to the third power socket of the third battery apparatus 148c. The third battery apparatus 148c may be electrically coupled to the power head 102 through the first power cable adapter 158a and the third power cable 150c. The power tool ensemble 100 also includes a second power cable adapter 158b having a cable-side connector configured to electrically couple to the battery-end connector 156 and a battery-specific plug configured to electrically couple to the fourth power socket of the fourth battery apparatus 148d. The fourth battery apparatus 148d may be electrically coupled to the power head 102 through the second power cable adapter 158b and the third power cable 150c. Having the third power cable 150c, the first power cable adapter 158a, and the second power cable adapter 158b in the power tool ensemble 100 may advantageously enable alternate use of the third battery apparatus 148c and the fourth battery apparatus 148d with the power head 102 and one of the first shaft coupler 104a or the second shaft coupler 104b, with a tool head from a manufacturer that is different from a manufacturer of the third battery apparatus 148c or a manufacturer of the fourth battery apparatus 148d, avoiding the expense of purchasing an external power source from the manufacturer of the tool head. Furthermore, use of the third power cable 150c alternately with the first power cable adapter 158a and the second power cable adapter 158b may advantageously be less expensive than using two battery-specific power cables. In an alternate version of this example, the power tool ensemble 100 may include the third power cable 150c and either the first power cable adapter 158a or the second power cable adapter 158b, accruing the advantage disclosed for the first power cable 150a.

Figure 5:
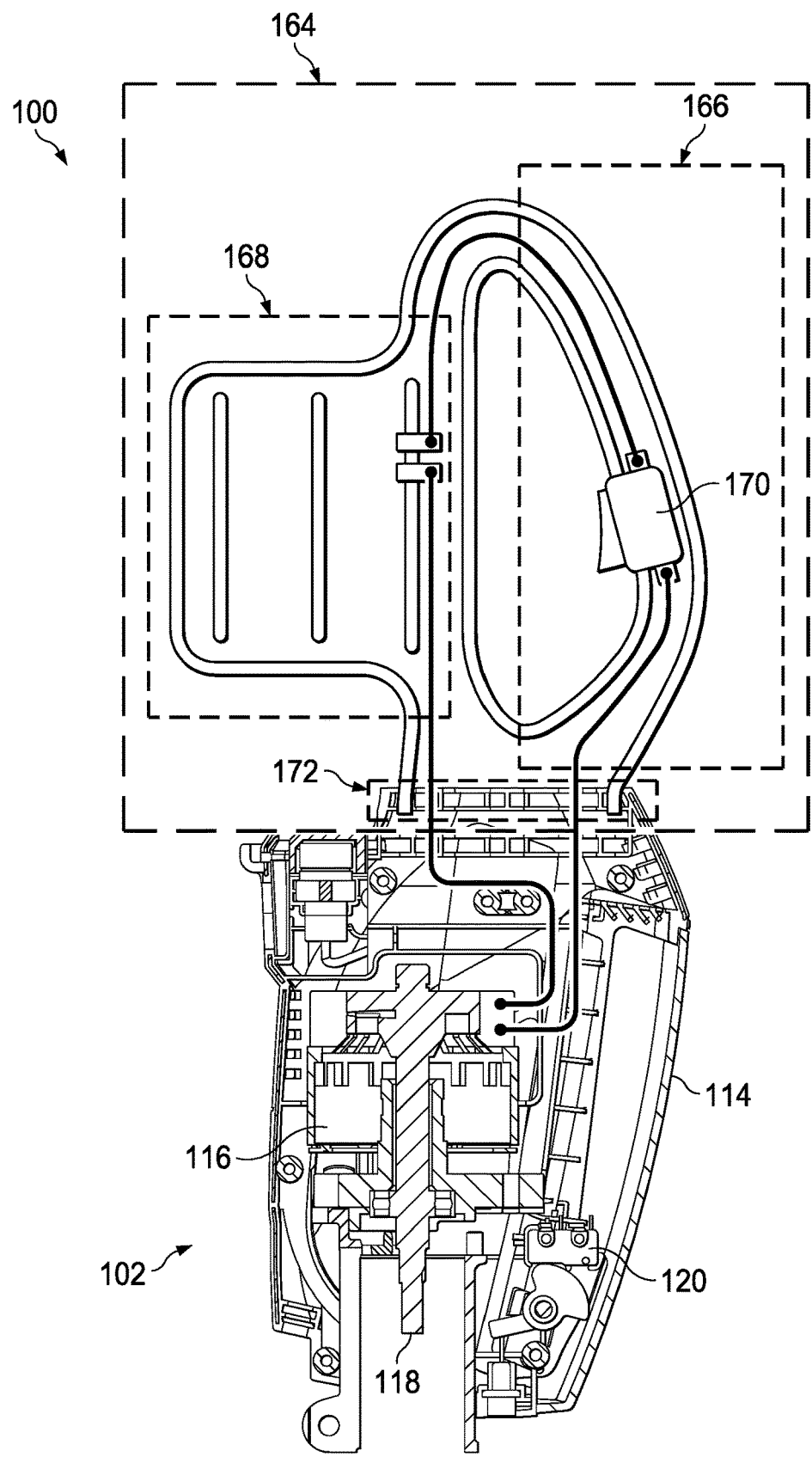
FIG. 5 depicts an example configuration of the power tool ensemble with an optional first rear extension.

FIG. 5 depicts an example configuration of the power tool ensemble 100 with an optional first rear extension 164 attached to the power head 102, opposite from the power shaft 118. In this example, the first rear extension 164 may include a rear handle 166, which may advantageously provide improved maneuverability for the handheld electrically powered landscaping tool. The first rear extension 164 may include a first battery mount 168, configured to accept one or more commercially available batteries. Having the first battery mount 168 on the first rear extension 164 may provide a more convenient alternative to an external battery pack such as a battery backpack, for smaller landscaping jobs. The first rear extension 164 may include a first rear electric switch 170, which may be mounted on the rear handle 166, as depicted in FIG. 5. In one version of this example, the first rear electric switch 170 may be electrically coupled between the first battery mount 168 and the electric motor 116 of the power head 102, as depicted in FIG. 5. The first rear electric switch 170 may thus control electrical power from a battery, not shown, mounted in the first battery mount 168 to the electric motor 116. In another version of this example, in which the first battery mount 168 is omitted, the first rear electric switch 170 may be wired in parallel to the electric switch 120 in the power head 102.

The first rear extension 164 may be attached to the power head 102 at an accessory port 172 of the power head 102, located opposite from the power shaft 118. The first rear extension 164 may be permanently attached, for example with adhesive, screws, or rivets. Alternatively, the first rear extension 164 may be removably attached, for example with detents or a threaded collar.

Figure 6:
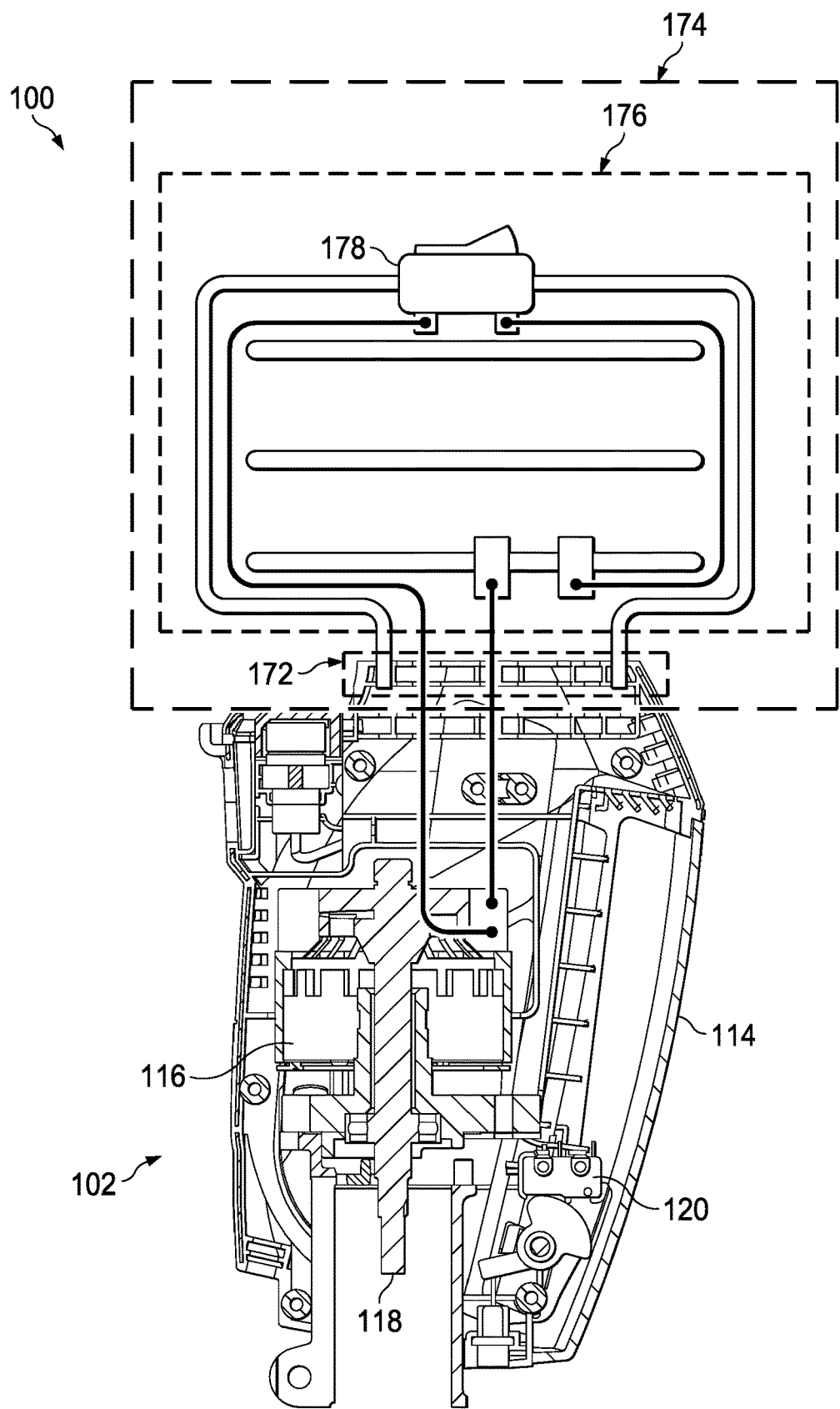
FIG. 6 depicts another example configuration of the power tool ensemble with an optional second rear extension.

FIG. 6 depicts another example configuration of the power tool ensemble 100 with an optional second rear extension 174 attached to the power head 102 at the accessory port 172. In this example, the second rear extension 174 may include a second battery mount 176 configured to accept one or more commercially available batteries. The second rear extension 174 may include a second rear electric switch 178, which may be mounted on the second battery mount 176, as depicted in FIG. 6. The second rear electric switch 178 may be electrically coupled between the second battery mount 176 and the electric motor 116 of the power head 102, as depicted in FIG. 6. The second rear electric switch 178 may thus control electrical power from a battery, not shown, mounted in the second battery mount 176 to the electric motor 116. The second rear extension 174 may be free of a handle, which may advantageously reduce a length of the handheld electrically powered landscaping tool and thus improve balance of the handheld electrically powered landscaping tool when implemented with long tool heads. The second rear extension 174 may be attached to the power head 102 permanently, or removably.

While various embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments. Rather, the scope of the disclosure should be defined in accordance with the following claims and their equivalents.

What is claimed is:

1. A power tool ensemble, comprising:
   a power head, including:
      a motor; and
      a power shaft mechanically coupled to the motor;
   a first shaft coupler, including:
      a first power shaft connecter configured to be capable of being mechanically coupled to the power shaft;
      a first shaft-specific connecter having a first tool shaft configuration configured to be capable of being mechanically coupled to a first tool shaft of a first tool head, the first shaft-specific connecter being coupled to the first power shaft connecter; and
      a first coupler housing around the first power shaft connecter and the first shaft-specific connecter, wherein the first power shaft connecter and the first shaft-specific connecter are rotationally supported in the first coupler housing; and
   a second shaft coupler, including:
      a second power shaft connecter configured to be capable of being mechanically coupled to the power shaft;
      a second shaft-specific connecter having a second tool shaft configuration configured to be capable of being mechanically coupled to a second tool shaft of a second tool head, the second shaft-specific connecter being coupled to the second power shaft connecter; and
      a second coupler housing around the second power shaft connecter and the second shaft-specific connecter, wherein the second power shaft connecter and the second shaft-specific connecter are rotationally supported in the second coupler housing;
   wherein the second tool shaft configuration is different from the first tool shaft configuration, the first shaft coupler is separate from the power head and the first tool head, and the second shaft coupler is separate from the power head and the second tool head.

2. The power tool ensemble of claim 1, wherein the power shaft has a cross section selected from the group consisting of a square cross section, a splined cross section, and a splined socket configuration.

3. The power tool ensemble of claim 1, wherein the first shaft-specific connecter has a splined socket configuration.

4. The power tool ensemble of claim 1, wherein the motor is a direct current (DC) electric motor.

5. The power tool ensemble of claim 4, wherein the power head includes an electric switch coupled to the DC electric motor, configured to control electric power to the DC electric motor.

6. The power tool ensemble of claim 5, wherein the power head includes a throttle cable adapter mechanically coupled to the electric switch, configured to operate the electric switch.

7. The power tool ensemble of claim 6, further comprising a throttle having a throttle cable configured to be capable of being mechanically coupled to the throttle cable adapter.

8. The power tool ensemble of claim 4, further including an add-on electric switch located outside of the power head, the add-on electric switch being electrically coupled to the DC electric motor.

9. The power tool ensemble of claim 4, wherein the power head includes a power cable socket electrically coupled to the DC electric motor.

10. The power tool ensemble of claim 9, further comprising a power cable having a power head plug configured to make an electrical connection to the power cable socket.

11. The power tool ensemble of claim 10, wherein the power cable has a battery-specific plug configured to electrically couple to an external power source.

12. The power tool ensemble of claim 10, wherein:
the power cable has a battery-end connector; and
further comprising a power cable adapter having a cable-side connector configured to electrically couple to the battery-end connector and a battery-specific plug configured to electrically couple to an external power source.

13. The power tool ensemble of claim 1, wherein the power head includes a head clamp mechanism around the power shaft configured to clamp on the first shaft coupler and to clamp on the second shaft coupler.

14. The power tool ensemble of claim 1, wherein the first shaft coupler includes a shaft coupler clamp mechanism around the first shaft-specific connecter configured to clamp on the first tool head.

15. The power tool ensemble of claim 1, further including a rear extension attached to the power head, the rear extension including at least one element selected from the group consisting of a rear handle, a battery mount, and a rear electric switch.

16. The power tool ensemble of claim 1, wherein the first shaft coupler is 3 inches to 7 inches long, and the second shaft coupler is 3 inches to 7 inches long.

17. The power tool ensemble of claim 1, wherein the first tool head is selected from the group consisting of a string trimmer head, a blade trimmer head, a reciprocating saw head, a chain saw head, and a hedge trimmer head, a garden tiller head, a pruning shears head, and a lawn edger head.

18. A power tool ensemble, comprising:
a power head configured to provide rotational mechanical power;
a first shaft coupler configured to transfer the rotational mechanical power to a first tool head, the first shaft coupler having a first coupler housing that is configured to be capable of being clamped on the tool head, wherein first shaft connecters of the first shaft coupler, which are configured to transfer the rotational mechanical power, are rotationally supported in the first coupler housing; and
a second shaft coupler configured to transfer the rotational mechanical power to a second tool head, the second shaft coupler having a second coupler housing that is configured to be capable of being clamped on the second tool head, wherein second shaft connecters of the second shaft coupler, which are configured to transfer the rotational mechanical power, are rotationally supported in the second coupler housing;
wherein the first shaft coupler is free of a mechanism to transfer the rotational mechanical power to the second tool head, and the second shaft coupler is free of a mechanism to transfer the rotational mechanical power to the first tool head.

19. The power tool ensemble of claim 18, wherein the power head includes:
an electric motor; and
a power shaft mechanically coupled to the electric motor, the first shaft coupler being configured to be capable of being mechanically coupled to the power shaft, and the second shaft coupler being configured to be capable of being mechanically coupled to the power shaft.

20. The power tool ensemble of claim 18, wherein the first shaft coupler is 3 inches to 7 inches long, and the second shaft coupler is 3 inches to 7 inches long.

\* \* \* \* \*